United States Patent [19]
Dunning et al.

[11] Patent Number: 5,763,970
[45] Date of Patent: Jun. 9, 1998

[54] ENCODER SYSTEM WITH COVER MOUNTED ENCODER

[75] Inventors: Gordon Robert Dunning, Versailles; Steven Wayne Parish, Lexington; Lowell Thomas Siders, Nicholasville, all of Ky.

[73] Assignee: Lexmark International, Inc., Lexington, Ky.

[21] Appl. No.: 808,770

[22] Filed: Mar. 3, 1997

[51] Int. Cl.⁶ .................................................. H02K 29/06
[52] U.S. Cl. ........................... 310/68 B; 310/68 R; 73/493
[58] Field of Search ................... 73/493, 756; 310/68 R, 310/68 B; 250/231.13, 231.14, 231.15, 231.16, 231.17, 231.18; 174/52.1; 318/89

[56] References Cited

U.S. PATENT DOCUMENTS

| | | | |
|---|---|---|---|
| 3,023,406 | 2/1962 | Jones | 340/347 |
| 3,024,986 | 3/1962 | Strianese et al. | 235/92 |
| 3,204,235 | 8/1965 | De Rosa | 340/347 |
| 3,894,232 | 7/1975 | Laspesa | 250/231 |
| 4,318,457 | 3/1982 | Dorsch et al. | 340/52 |
| 4,475,034 | 10/1984 | Maddox et al. | 250/231 SE |
| 4,536,649 | 8/1985 | Kozai et al. | 250/231 SE |
| 4,621,256 | 11/1986 | Rusk | 340/347 P |
| 4,653,834 | 3/1987 | Norden | 339/125 R |
| 4,794,250 | 12/1988 | Togami | 250/231 |
| 4,803,362 | 2/1989 | Butts | 250/229 |
| 4,888,481 | 12/1989 | Kallin et al. | 250/231 |
| 4,979,793 | 12/1990 | Bowen et al. | 350/96.2 |
| 4,988,905 | 1/1991 | Tolmie | 310/68 B |
| 5,010,263 | 4/1991 | Murata | 310/68 B |
| 5,013,911 | 5/1991 | Koshida et al. | 250/239 |
| 5,103,346 | 4/1992 | Chang | 359/855 |
| 5,126,510 | 6/1992 | Bauer et al. | 174/52.1 |
| 5,133,431 | 7/1992 | Braun | 188/1.11 |
| 5,264,661 | 11/1993 | Luettgen | 174/52.3 |
| 5,293,125 | 3/1994 | Griffen et al. | 310/68 B |
| 5,337,605 | 8/1994 | Schultz et al. | 73/335.02 |
| 5,550,415 | 8/1996 | Adachi et al. | 310/68 R |
| 5,588,757 | 12/1996 | Unosawa et al. | 400/279 |

*Primary Examiner*—Thomas M. Dougherty
*Assistant Examiner*—Burton S. Mullins
*Attorney, Agent, or Firm*—John A. Brady

[57] ABSTRACT

Sensor (41) is held between its arms (63) and nubs 60 in cover (31). A circuit board (57) on which the sensor is mounted remains outside of the cover, and panels (55) of the sensor (41) extend upward to prevent the circuit board (57) from collapsing leads (45, 53) which connect the sensor to the circuit board. Reliable operation is obtained without narrow tolerances.

12 Claims, 3 Drawing Sheets

ENCODER SYSTEM WITH COVER MOUNTED ENCODER

TECHNICAL FIELD

This invention relates generally to sensor systems and more particularly, concerns an improved structural arrangement for an encoder wheel or part used in cooperation with a sensor to track rotation of the rotating part.

BACKGROUND OF THE INVENTION

Encoder systems are commonly used to track rotation of rotating bodies. Such systems employ a marked member which is attached to the rotating body to rotate with it and a sensor operative to sense the marks on the marked member as they move with respect to the sensor. In one form of encoder system, an encoder wheel on a rotatable shaft has slots in a regular circular pattern spaced slightly inward of the outer circumference of the wheel. Selected ones of the slots may differ from most of the slots to define a reference (sometimes termed "home") position of the encoder wheel.

In one form of the encoder system, the sensor is located on opposite sides of the encoder wheel having slots as marks. Light is beamed by the sensor from one side across the encoder to be photosensitively received by the sensor on the opposite side, creating an electrical response defined by each slot of the encoder and by the speed of rotation of the encoder wheel. As an alternative, the encoder wheel may have black (light absorptive) and light (light reflective) markings; and the encoder would then have both a light source and a photosensitive member on one side the encoder wheel.

All of the foregoing is entirely conventional. A known prior encoder system has many similar parts to an embodiment of the invention described below in that the prior sensor is mounted on a circuit board, the encoder is mounted on a motor shaft, and the encoder and sensor are surrounded by a cover which attaches to the motor. Also, in such a prior encoder system an adapter plate through which the motor shaft passes is mounted by screws to the face of the motor, the adapter plate supporting both the circuit board and the cover.

DISCLOSURE OF THE INVENTION

In accordance with one form of this invention, use of an adapter plate is merely preferred as a member on which the cover can be fixed; and the adapter plate does not directly support the sensor. Instead, the sensor and the circuit board on which the sensor is mounted are supported by the cover. In this arrangement, the sensor is held on the cover between detents on the side of the sensor which press against the sides of an opening in the cover and extensions of the sensor which extend over the sides of the opening. The circuit board on which the sensor is mounted remains outside of the cover.

In the earlier-mentioned prior system having similar parts, the circuit board was mounted on the adapter plate, with the sensor mounted on the circuit board at a location proximate to the encoder wheel. This prior art arrangement provides a cantilevered positioning of the sensor, and the prior circuit board must be wider than the circuit board described below so as to be the cantilever member for the sensor. Also, because a cantilever inherently is less stable than braced structures, the prior system required narrow tolerances in its design. Pursuant to certain aspects of this invention, the sensor is held perpendicular to the encoder wheel in a press fit in the cover, and tolerances need not be narrow to achieve reliable operation of the encoder system.

In an embodiment of this invention described below, the sensor is mounted to a circuit board by its electrical leads, and the leads are protected from collapse during insertion by support walls parallel to the leads.

BRIEF DESCRIPTION OF THE DRAWING

The details of this invention will be described in connection with the accompanying drawing in which.

BEST MODE FOR CARRYING OUT THE INVENTION

Figure 1:
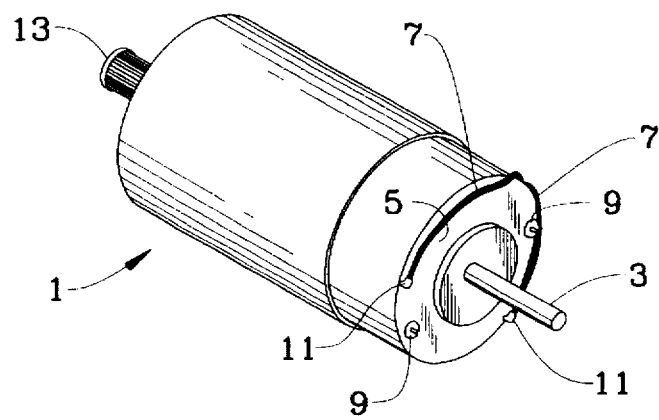
FIG. 1 is a perspective view of a conventional motor.

With reference to FIG. 1, a conventional electrical motor 1 has a shaft 3 extending from one end face 5 of motor 1, the shaft 3 being rotated by motor 1 during operation. Motor 1 has electrical wires 7 to receive drive power and two screws 9 on opposite sides of end face 5. Wires 7 have bent sections 11 protected by plastic electrical tape where they leave the bond of motor 1. A drive pulley 13 is the member from which power is taken for use external to the motor 1.

Figure 2:
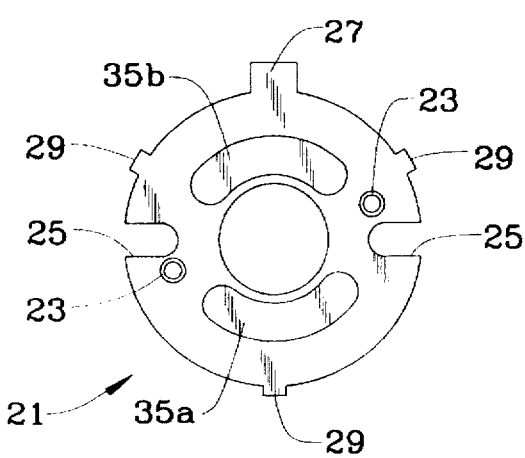
FIG. 2 is a front view of an adapter plate to be attached to the motor.
Figure 3:
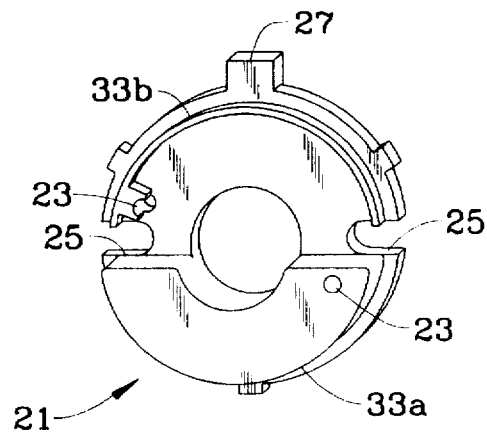
FIG. 3 is an inner perspective view of the adapter plate.
Figure 6:
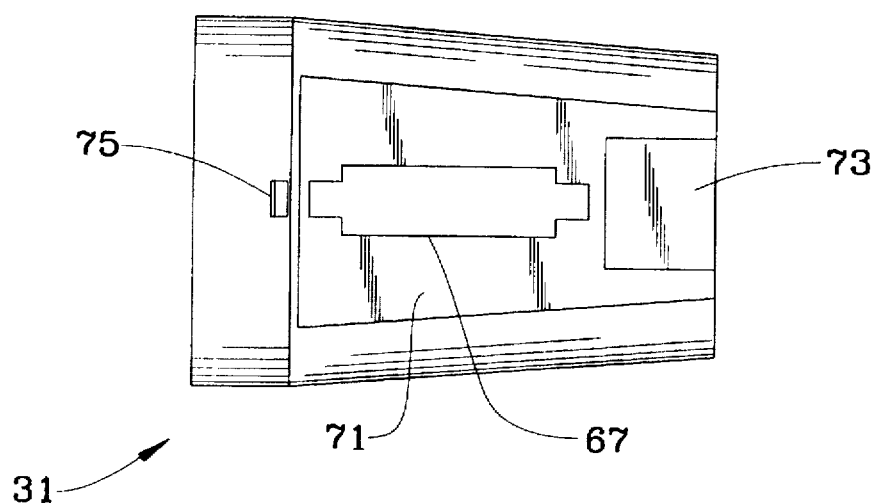
FIG. 6 is a top view of the sensor assembly cover.
Figure 8:
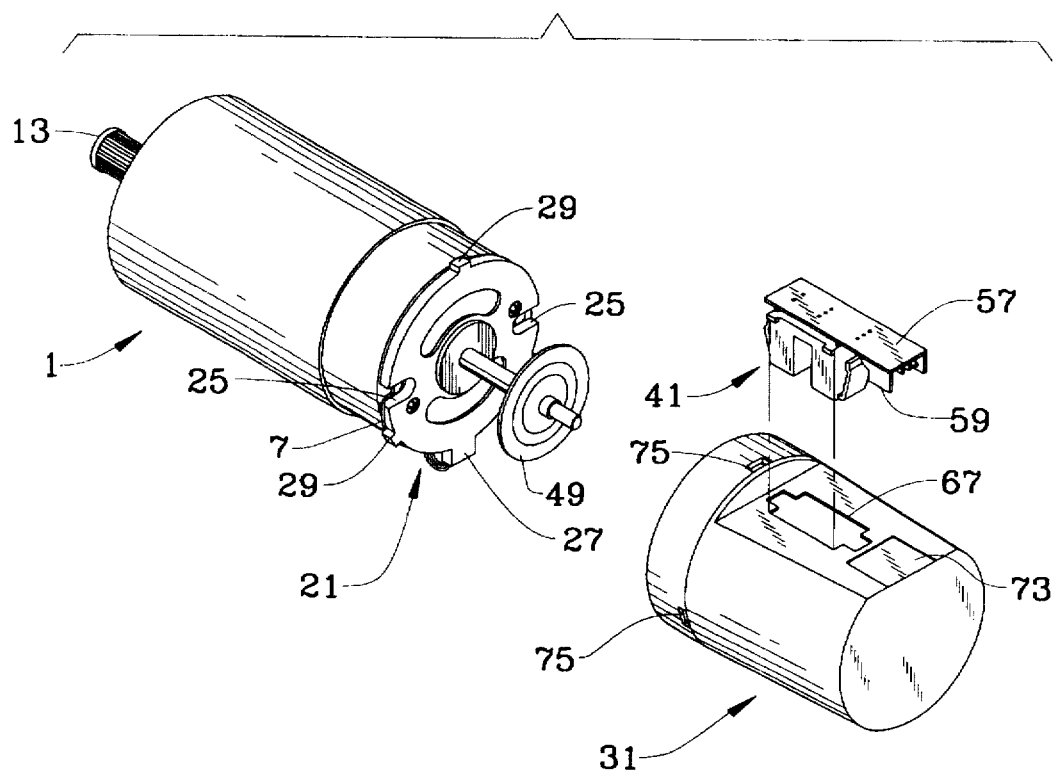
FIG. 8 is an exploded view of the sensor assembly parts in their assembled positions.

FIG. 2 shows the side of an adapter plate 21 which is outside when plate 21 is installed on motor 1. Adapter plate 21 has two screw holes 23 which receive screws 9. Plate 21 has two inset openings 25 on opposite sides to receive the wires 7, a large outwardly extending tab 27 to support wires 7, and three shorter, outwardly extending nubs 29, separated by 120 degrees, to support a cover 31 (FIG. 6). As seen from the perspective view in FIG. 3 of the inward side of the plate 21, plate 21 has inner hubs 33a and 33b so as to leave space for wires 7 to be wound around plate 21 and reach tab 27 (FIG. 8). Intermediate curved portions 35a and 35b (FIG. 2) on the front of plate 21 are inset portions believed to be to facilitate molding the hubs 33a and 33b respectively.

Figure 4:
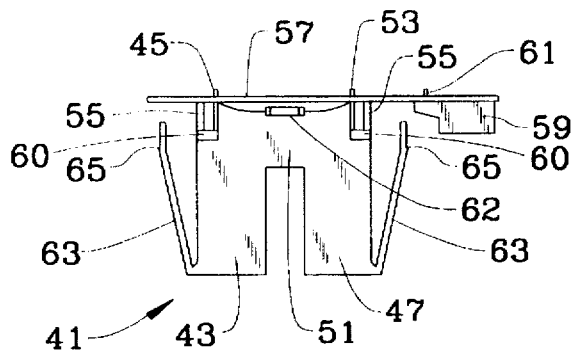
FIG. 4 is a side view of the sensor mounted on a printed circuit board.

FIG. 4 shows a side view of a sensor 41, which is a continuous block of molded plastic which has a light source embedded in a leg 43. Above leg 43 two leads 45 (one shown in the side view of FIG. 4) exit from the top of the plastic of sensor 41. A leg 47 of the sensor 41 is spaced from the leg 43 an amount to readily receive an encoder wheel 49 (shown in FIG. 8), while the two legs 43 and 47 are joined by a bridge section 51 at the top. Leg 47 has embedded in it a photosensitive member, and above leg 47 three leads 53 (one shown in the side view of FIG. 4) exit from the top of the plastic of sensor 41. One of the leads 53 carries power, one of the leads 53 is to ground, and the third lead 53 carries a sensed signal. Sensor 41 has two upwardly extending, thin panels 55 on opposite sides, the tops of which rest against a circuit board 57 for physical support. Panels 55 also are part of the continuous block of molded plastic comprising sensor 41.

Circuit board 57 is a thin, single layer conventional printed circuit board. Leads 45 and 53 extend through holes in the circuit board 57 and are soldered in place on top of board 57, as is conventional. Leads 45 and 53 physically attach, as well as electrically connect, the sensor 41 to circuit board 57. Additionally, a cable connector 59, having three terminal pins 58 (FIG. 5) to carry the three potentials of leads 53, is mounted on the circuit board 57. Pins 58 are connected to three leads 61 also extending through holes of board 57 and soldered. Connector 59 is located on the same side of circuit board 57 as is sensor 41 Finally, FIG. 4 shows a resistor 62 to limit the current to the light source connected between two of the contacts of leads 45 and 53.

Figure 5:
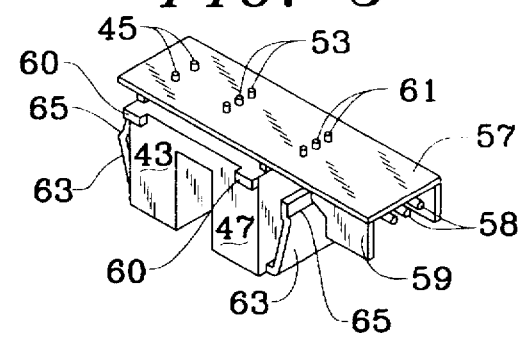
FIG. 5 is a perspective view from the top of the printed circuit board with the sensor mounted.

As shown in FIG. 5, circuit board 57 is only just wider than the narrow dimensions of sensor 41 or connector 59. Circuit board 57 is long enough to cover both sensor 41 and connector 59. Sensor 41 and connector 59 are generally centered under board 57 with their narrow dimensions corresponding in orientation to the narrow dimension of board 57. The body of sensor 41 has extensions or nubs 60 located at the four upper corners of sensor 41 and extending outward. The nubs 60 on one side as shown in FIG. 5 are symmetrical and otherwise the same on the side of sensor 41 opposite to that shown in FIG. 5. Nubs 60 are part of the continuous block of molded plastic of sensor 41.

FIG. 5 also shows the connector pins 60 configured to receive a matching cable. Except for the small width of circuit board 57, other aspects of the circuit board 57 and connector 59 as discussed above are essentially conventional. Also fundamentally different are the panels 55, nubs 60 and a pair of spring arms 63, which are part of the continuous block of molded plastic of sensor 41, connected at the bottom end of sensor 41. Spring arms 63 are located on opposite sides of the long dimension of sensor 41. Except for panels 55 and spring arms 63, sensor 41 is essentially conventional.

Spring arms 63 are formed bowed outward and each has an upper notch 65 followed by a further upwardly extended portion. When pushed inward toward the body of sensor 41, arms 63 have an inherent resilience which acts as an outward force. Upper notches 65 are detent surfaces which encounter the edges of a hole 67 (FIG. 6) in a cover 31 as will be discussed. The vertical spacing between notches 65 and nubs 60 is controlled to tightly fit on cover 31.

FIG. 6 is a top view of the cover 31. Shaft 3 of the motor 1 and the encoder wheel 49 are enclosed by cover 31 with hole 67 opposite encoder 49. Cover 31 has a flat section 71 in which the generally rectangular hole 67 is located. Hole 67 is of a size to receive the sensor 41 for access to encoder 49, with arms 63 flexing inwardly during insertion of sensor 41 and then springing outwardly to lodge notches 65 under the edge of each side of hole 67. The arms remain somewhat flexed to firmly hold sensor 41 and therefore circuit board 57, to which it is attached, and connector 59, in place. Nubs 60 then extend over the opposite sides of hole 67 to define a limit to the downward movement of sensor 41 and result in the tight fit on cover 31. Also, the flat bottom of connector 59 rests in a flat section 73 on the outside of cover 31.

Panels 55 of sensor 41 (FIG. 5) are parallel to the line of leads 45 on one side of sensor 41 and the line of leads 53 on the opposite side of sensor 41. Panels 55 contact circuit board 57 while inserting sensor 41 through hole 67. This blocks pressure from bearing on leads 45 and 55 which could collapse leads 45 and 55.

Figure 7:
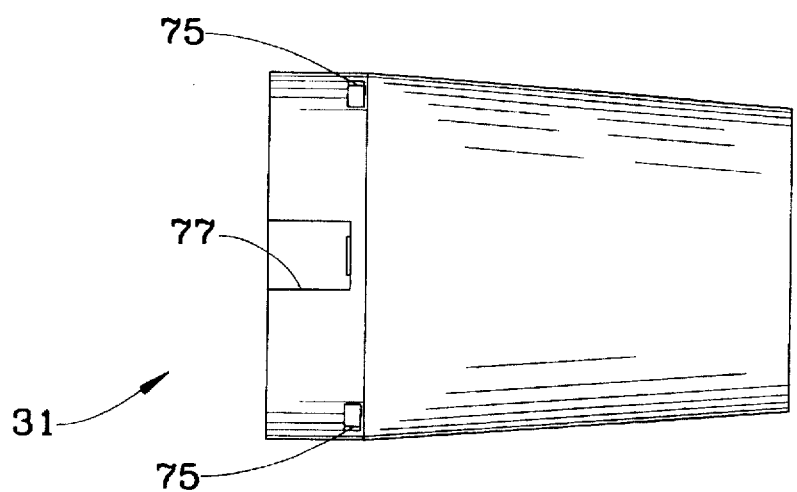
FIG. 7 is a bottom view of the sensor assembly cover from the side opposite that of FIG. 6.

Also shown in FIG. 6 is one of three holes 75 which receive the nubs 29 of adapter plate 21. FIG. 7 is a view of cover 31 on the side opposite the view of FIG. 6 and shows the other two holes 75 and a notch 77 which fits around tab 27 of adapter plate 21. Cover 31 is a single piece of molded plastic, such as polycarbonate or ABS (acrylic butyl styrene) or an alloy of them.

Figure 9:
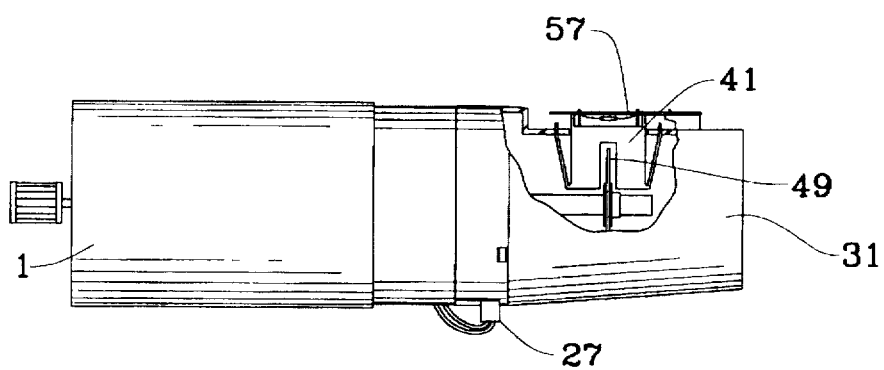
FIG. 9 is a partially cut away view showing a complete sensor assembly.

FIG. 8 shows the parts as discussed in their orientation when assembled but cover 31 spaced from motor 1 and sensor 41 spaced from cover 1. Adapter plate 21 is attached to motor 1 by screws 9. Cover 31 is pressed over adapter plate 21 until nubs 29 enter holes 75. FIG. 9 shows the final assembly with a portion of cover 31 cut away to show sensor 41 in place to sense rotation of encoder 49.

As an alternative to employing the adapter plate 21, the motor 1 could be modified to have holes in its cover, and the sensor cover 31 could be modified to have yieldable arms, extending with flexing over the motor 1, with end nubs which fit into the holes in motor 1 and are held in the holes by resilience of the arms.

Variations and alternatives employing the sensor cover to hold the sensor can be anticipated which would be implementations of this invention.

We claim:

1. A sensor mounted on a circuit board, said sensor having spring arms on opposite sides of said sensor, each said spring arms being attached to said sensor at one end of said sensor, being bowed outward, and having a notch spaced from said one end, electrical leads of said sensor extending from said sensor and attached to said circuit board to hold said sensor to said circuit board, and at least one supporting member means extending from said sensor to contact said circuit board and block collapse of said leads when pressure on said circuit board in the direction of said sensor is sufficient to move said spring arms inward.

2. The mounted sensor as in claim 1 in which said arms and said sensor are a continuous, single molded part.

3. The mounted sensor as in claim 1 in which said supporting member and said sensor are a continuous, single molded part.

4. The mounted sensor as in claim 1 in which said arms, said supporting member and said sensor are a continuous, single molded part.

5. A combined motor and sensor comprising, a motor having a shaft turned by said motor, an encoder mounted on said shaft for movement therewith, a cover supported by said motor and generally enclosing said encoder, said cover having an opening having opposing sides, said opening providing access through said cover to said encoder, a sensor to sense movement of said encoder, said sensor being of size to pass through said opening, said sensor having resilient spring arms with a detent surface, said arms being flexed against said opposing sides of said opening and holding said sensor against extraction from said opening by abutment of each said detent surface with each said side, a circuit board, said sensor being mounted on said circuit board, said spring arms being on opposite sides of said sensor, each of said spring arms being attached to said sensor at one end of said sensor, being bowed outward, and having said detent surface spaced from said one end, electrical leads of said sensor extending from said sensor and attached to said circuit board, and at least one supporting member means extending from said sensor to contact said circuit board and block collapse of said leads when pressure on said circuit board in the direction of said sensor is sufficient to move said spring arms inward.

6. The combined motor and sensor of claim 5 in which said sensor also comprises at least one extension integral with said sensor which extends over the side of said opening.

7. The combined motor and sensor of claim 5 in which said arms and said sensor are a continuous, single molded part.

8. The combined motor and sensor of claim 5 in which said supporting member and said sensor are a continuous single molded part.

9. The combined motor and sensor of claim 5 in which said arms, said supporting member and said sensor are a continuous single molded part.

10. The combined motor and sensor of claim 6 in which said arms and said sensor are a continuous, single molded part.

11. The combined motor and sensor of claim 6 in which said supporting member and said sensor are a continuous single molded part.

12. The combined motor and sensor of claim 6 in which said arms, said supporting member and said sensor are a continuous single molded part.

* * * * *